United States Patent [19]

Shearer et al.

[11] Patent Number: 4,469,834
[45] Date of Patent: Sep. 4, 1984

[54] POLY(BUTYLENE TEREPHTHALATE) BASED MOLDING RESINS

[75] Inventors: Wilfred L. Shearer, Mountainside; Stephen M. Sinker, Lebanon; Richard A. Wolf, Plainfield, all of N.J.

[73] Assignee: Celanese Corporation, New York, N.Y.

[21] Appl. No.: 493,455

[22] Filed: May 11, 1983

[51] Int. Cl.$^3$ ............... C08K 5/13; C08K 5/24; C08L 67/02
[52] U.S. Cl. .................... 524/193; 524/601; 524/605
[58] Field of Search ............. 524/194, 193, 601, 605

[56] References Cited

U.S. PATENT DOCUMENTS

| T945,001 | 4/1976 | Dexter | 524/194 |
|---|---|---|---|
| 3,660,438 | 5/1972 | Dexter | 524/194 |
| 3,773,722 | 11/1973 | Dexter | 106/263 |
| 3,870,680 | 3/1975 | Schurdak | 524/194 |
| 3,888,824 | 6/1975 | Dexter | 524/194 |
| 4,044,073 | 8/1977 | Baron et al. | 524/605 |
| 4,044,200 | 8/1977 | Turbett | 524/194 |
| 4,052,356 | 10/1977 | Breitenfellner et al. | 524/605 |
| 4,065,635 | 12/1977 | Kiss | 524/194 |
| 4,066,610 | 1/1978 | Kiss et al. | 524/194 |
| 4,104,242 | 8/1978 | Kochanowski et al. | 524/194 |
| 4,242,473 | 12/1980 | Nametz et al. | 524/605 |

FOREIGN PATENT DOCUMENTS 2310800 9/1973 Fed. Rep. of Germany ...... 524/194

OTHER PUBLICATIONS

Ciba-Geigy's Product Bulletin "Irganox ® MD-1024" (undated).

Primary Examiner—Ronald W. Griffin
Attorney, Agent, or Firm—Roderick B. Macleod

[57] ABSTRACT

There is provided an improved molding resin capable of being molded into an article exhibiting reduced tendency to corrode a copper surface when the molded resin and the copper surface are placed in spaced relationship in a common unventilated atmosphere at elevated temperatures, as measured by the Bell Telephone Laboratories Copper Corrosion Test at temperatures within the range of from 150° to 175° C., wherein the molding resin comprises the combination of (a) a poly(butylene terephthalate) based polymer and aromatic halogen groups in a flame retardant amount, and (b) an alkylhydroxyphenylalkanoyl-hydrazine in an amount that is within the range of from 0.05 to 0.6% by weight, based on the weight of the molding resin, and less than 0.8% by weight based on the polymer.

8 Claims, 1 Drawing Figure

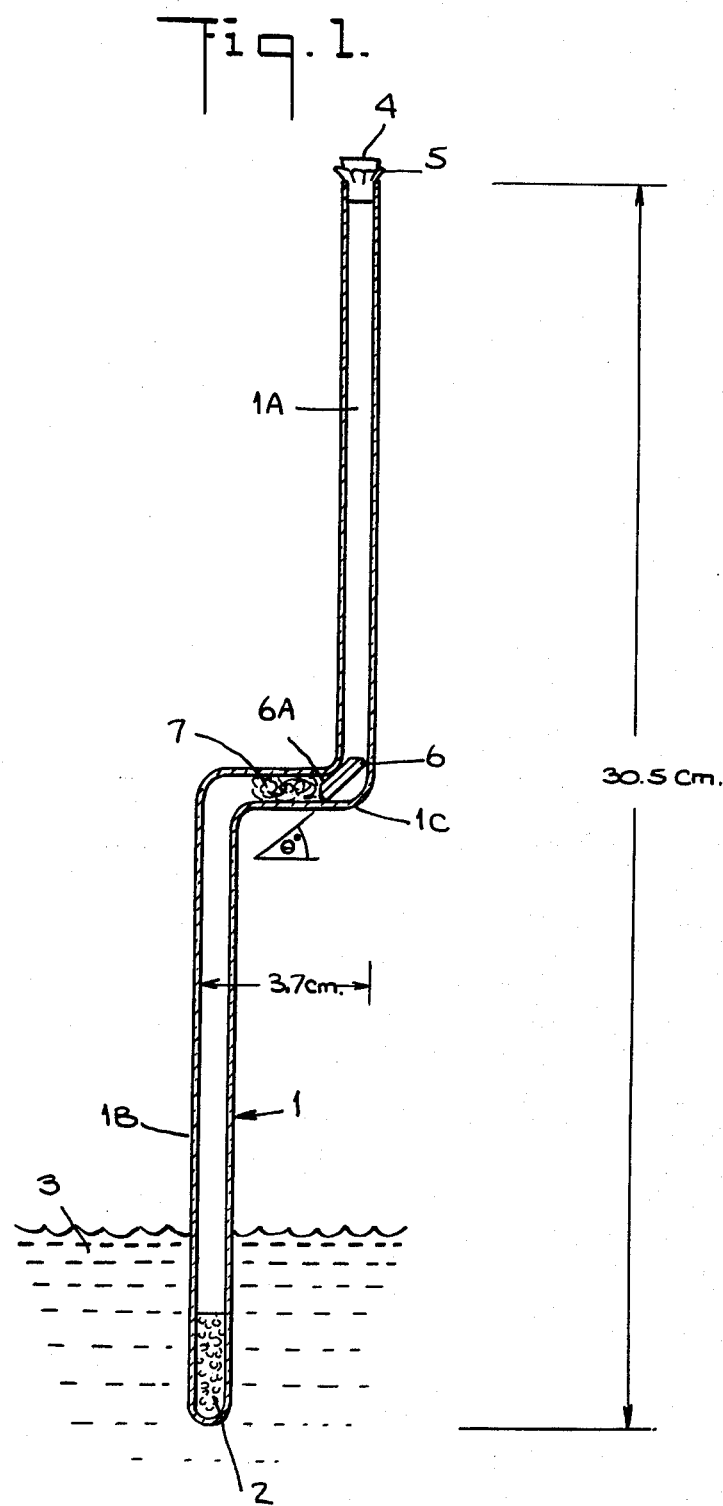

POLY(BUTYLENE TEREPHTHALATE) BASED MOLDING RESINS

BACKGROUND (i) Field of Invention

This invention relates generally to improved poly(butylene terephthalate) polymer based molding resins for making components for use in metallic electrical assemblies in an elevated temperature environment. Such components are typically prepared from so-called "flame retardant" molding compositions. More particularly, it relates to flame retardant molding resins for making components having reduced tendency to corrode a copper surface exposed to a common unventilated atmosphere at ambient temperatures within the range 100° C. to 180° C. The components are prepared from flame retardant halogen-containing molding compositions that contain defined amounts of an alkylhydroxyphenylalkanoylhydrazine. The invention also relates to the molding process; the molded less corrosive component; and the eletrical equipment containing such components.

(ii) Prior Art

Components prepared from flame retardant molding resins containing at least 50 weight percent poly(1,4-butylene terephthalate) based polymer and aromatic halogen groups, have been widely used in metallic electrical assemblies in unventilated environments at elevated temperatures below 100° C. However, electrical equipment manufacturers have been hesitant to utilize the same components in new electrical applications wherein the elevated temperature environment is within the range from 120° C. to about 150° C., because of fear of corrosion to fine metal electronic parts having surfaces not in direct contact with the polymer. Such new applications include for example telephone connector assemblies that are compact and carry high currents.

Bell Telephone Laboratories has developed a screening test for predicting the suitability of a given molding composition for such applications. The test is fully described hereinafter in Example 3.

U.S. Pat. No. 4,104,242 (Kochanowski et al.), Example 1, exemplifies molded articles comprising poly(1,4-butylene terephthalate), commonly known as PBT, and N,N'-bis(3,5-ditert-butyl-4-hydroxyhydrocinnamoyl)-hydrazine (Ciba-Geigy Corporation, Irganox ® MD-1024). The articles had improved "long term (high) voltage breakdown resistance", when tested in the form of rotors for distributors of automotive ignition systems. Nowhere does the patent refer to the corrosion rate of the metallic portion of the rotor and/or distributor. The Example does not use a flame retardant composition, although elsewhere it is stated that the molding powder formulations may contain flame retardants etc (column 5, lines 55-58). The Example does not state the temperature reached by the rotor in the test, but it was presumably quite low since rotors can be readily removed from hot automobile engines without the use of gloves.

Ciba-Geigy's product bulletin "Irganox ® MD-1024" (undated) described MD-1024 as a metal deactivator and antioxidant which when incorporated into polymeric materials such as polyolefins and nylons will prevent failure of the polymer when these materials are used as insulation in direct contact with metals, such as copper. The bulletin does not specifically refer to polyesters. It often recommends the use of Irganox 1010 (a high performance phenolic antioxidant that is free of nitrogen) in conjunction with Irganox ® MD-1024.

In FIG. 2 of the product bulletin, increasing the concentration of blends of Irganox ® MD-1024 and Irganox ® 1010, up to 0.8%, clearly shows a nearly directly linear increase in stabilizer performance. The product bulletin also teaches that "(i)t is also expected that Irganox ® MD-1024 may have utility in deactivating titanium and other metal catalyst residue present in polyolefins and other polymers, thereby improving end-use thermal and light stability." The bulletin further cites two patents (both assigned to Ciba-Geigy): U.S. Pat. Nos. 3,660,438 and 3,773,722.

U.S. Pat. No. 3,660,438 discloses alkylhydroxyphenylalkanoyl-hydrazines as stabilizers against oxidative and/or thermal degradation for organic materials. (Column 1, lines 35-38). Examples of organic materials are listed as: vinyl resins, vinyl esters, butadienes, styrenes, polyolefins, polyurethanes, polyamides, polyacetals and polyesters, such as polyethylene terephthalate. The claims of the '438 patent are directed to the compound - alkylhydroxyphenylalkanoyl hydrazine.

U.S. Pat. No. 3,773,772 is a divisional of the '438 patent and discloses identical subject matter. The claims of the '722 patent are directed to the composition comprising polymeric materials with up to 5% of an alkylhydroxyphenylalkanoyl hydrazine compound as a stabilizer.

U.S. Pat. No. 3,888,824 is a continuation-in-part of the '438 patent and is of general interest in that it discloses an alkylhydroxyphenyl alkanoylhydrazine for the stabilization of polyesters such as polyethylene terephthalate (Column 4, lines 28-29).

SUMMARY OF THE INVENTION

In contrast to the forementioned prior art there has now been discovered a flame retardant molding resin that is also capable of being molded into an article exhibiting reduced tendency to corrode a copper surface when the molded resin and the copper surface are placed in spaced relationship in a common unventilated atmosphere at elevated temperatures (as measured by the Bell Telephone Laboratories Copper Corrosion Test at temperatures within the range of from 150° to 175° C.), wherein the molding resin comprises the combination of (a) a poly(butylene terephthalate) based polymer and (b) a flame retardant comprising aromatic halogen groups in a flame retardant amount, and (c) an alkylhydroxyphenylalkanoylhydrazine in an amount that is within the range of from 0.05 to 0.6% by weight, based on the weight of the poly(butylene terephthalate) based polymer, and less than 0.8% by weight based on the polymer.

This is surprising for a variety of reasons, as shown below

Firstly, two experimental studies have suggested that the anti-corrosion effectiveness of adding small amounts of (e.g. 0.2%) Irganox MD-1024 to poly(1,4-butylene terephthalate) based resins is not a result of inhibiting the oxidative or thermal degradation of such resins. In particular, a subsequent hot air aging study at 190° C. by A. DeGuia (unpublished) showed that the addition of 0.2% Irganox MD-1024 to a PBT based molding resin did not improve its oxidative/thermal stability, as measured by percent tensile strength retention at 190° C. Also, Richard M. Lum of Bell Laboratories made a study of the pyrolytic reactions during thermal degradation of PBT ("Polymer Preprints", Vol. 19, No. 2, September, 1978 published by American Chemical Society). Lum does not list any major volatile decomposition products which both corrode copper and have boiling points below those used in the Bell corrosion test.

Secondly, assuming arguendo that the additive does inhibit degradation of the PBT resin, then it is surprising (1) that such small claimed amounts are effective; (2) that the presence of more additive is harmful; (3) that the presence of the phenolic antioxidant Irganox MD-1010 is harmful, rather than beneficial; and (4) that high weight ratios of titanium dioxide to Irganox MD-1024 can be tolerated.

THE DRAWINGS

FIG. 1 is a semi-diagrammatic front elevation of the Bell Telephone Laboratories Copper Corrosion Test.

DESCRIPTION OF THE PREFERRED EMBODIMENTS

The nature of the preferred embodiments of the invention is best understood by the Examples contrasted to the Comparative Examples, and the claims, hereinafter. Such Examples are not intended to limit the scope of the invention.

EXAMPLE 1 (Polymer Preparation)

This Example described methods of preparing two poly(butylene terephthalate) based polymers used in preparing molding resins in Example 2 (Molding Resin Preparation) that were subsequently evaluated by the Bell Corrosion Test as described in Example 3. It is perhaps relevant to the claimed invention since it is believed that Irganox MD-1024 is a corrosion inhibitor by the Bell Corrosion Test on account of its ability to react with volatile corrosive trace impurities in PBT based polymers to form products of reduced volatility. However, most if not all processes for making PBT polymer would result in the contaminants listed hereinafter.

Two types of conventional PBT based polymer were prepared. PBT-1 was essentially poly(1,4-butylene terephthalate) polymer. PBT-2 was essentially a brominated copolyester.

PBT-1 was a commericaly available polymer prepared essentially in the following manner. A commerical two stage batch polymerization line was utilized to produce PBT-1. A dimethyl terephthalate 1/2.1-2.2 molar proportion 1,4-butylene glycol mixture was heated from 150° C. to approximately 210° C. Evolved methanol was completely removed. Following methanol removal, the temperature of the reactants was raised to 270°-300° C. and vacuum applied while mixing. Excess 1,4-butylene glycol above 1.0 molar proportions was removed by use of about 0.06 weight percent of a titanium dioxide catalyst and internal pressure of 0.5–1.0 mm Hg. in an alcoholysis interchange reaction. After polymerization, triphenylphosphite was added at a level of about 0.01 percent by weight, as a stabilizer.

PBT-1 had an inherent viscosity of 0.75 dl/gm and, according to tests on similarly prepared product, contained trace contaminants of tetrahydrofuran; furan; butenal; butanal; acrolein; and propionaldehyde.

PBT-2 was prepared essentially in the same manner as PBT-1, except that a portion of the 1,4-butylene glycol was replaced by 2,3,5,6-tetrabromo-1,4-bis(2-hydroxy) ethylene benzene. The brominated monomer was added at 14 weight percent of total polymer. PBT-2 had essentially the same inherent viscosity as PBT-1 and also contained the forementioned types of trace contaminants.

EXAMPLE 2 (Molding Resin Preparation)

Table 1 summarizes the composition of five different flame retardant, reinforced, molding resins "M1"–"M5" that were prepared from either PBT-1 or PBT-2, and which were used in the Comparative Examples hereinafter.

TABLE 1

Molding Resin Compositions
(Weight Percent of Composition)

| Comp. | Code Ref. | | | | |
|---|---|---|---|---|---|
| | M1 | M2 | M3 | M4 | M5 |
| PBT-1 | — | 58.7 | 65.8 | 57.2 | 67.8 |
| PBT-2 | 62.5 | — | — | — | — |
| OCF 419 FIBERGLASS | 30.3 | 29.0 | 18.0 | 29.0 | 18.0 |
| ANTIMONY TRIOXIDE | 3.6 | 4.85 | 6.5 | — | 5.5 |
| ASBESTOS | 2.6 | 2.6 | 3.0 | — | — |
| TEFLON K | — | — | — | 0.5 | 0.4 |
| DECABROMO DIPHENYL OXIDE | — | 4.85 | 6.5 | 6.5 | 7.0 |
| ONCOR - ANTIMONY OXIDE | — | — | — | 5.5 | — |
| PHENOXY PKHH | 1.0 | — | — | 1.0 | 1.0 |
| ACRAWAX C | — | — | 0.2 | 0.3 | 0.3 |

The typical method of preparation was essentially as follows. All ingredients were salt and pepper tumble blended; passed through a 1″ Brabender extruder with barrel and die temperatures set to give a 480° F. melt, and with a screw speed of about 80 RPM, to form pellets; the pellets were pulverized in a Mikro Pulverizer and screened. Only those particles which passed through a 30 mesh screen and were retained by a 50 mesh screen were used in the corrosion test described in Example 3. While the ingredients were not dried prior to extrusion it should be noted that drying PBT polymer typically removes moistre at or close to the surface of the particles, but does not remove trace contaminants below the surface of the particles. The named additives blended with the polymer are well known to one skilled in the art.

EXAMPLE 3 (Copper Corrosion Test)

The Bell Laboratories Copper Corrosion Test is described below and illustrated by FIG. 1. FIG. 1 shows a special test tube (1) mounted vertically (by means not shown) with the test material (2) in the bottom of the special test tube. The test tube is partially immersed in oil (3) in a heated oil bath (not shown) such that the upper level of the test material is below the level of the oil. The open end of the test tube is plugged with a cork (4) wrapped in aluminium foil (5). The test tube has two vertical portions (1A and 1B) each around 14 cm. long, which are connected by a horizontal portion or step (1C) about 3.7 cm. long. The test tube is formed from glass tubing having an internal diameter of 1.0 cm. and an external diameter of 1.2 cm. A copper mirror (6) is in the step of the test tube in an inclined position with angle θ degrees of about 30-60 degrees. The copper side (6A) of the mirror is the upper side. It should be noted that in Examples 4C-24 a minor precautionary modification was made to the standard Bell test. In particular, a small amount of spun fiberglass (7) was placed directly below the copper mirror, beneath the bend in the test tube, to prevent the mirror from falling into the powdered resin in the bottom of the tube. The written test description, as provided by Bell, now essentially follows.

1. Outline of Method

A thin copper film is exposed under controlled conditions to gaseous, solid, or liquid materials. The effect on the copper film is noted after a specified exposure period.

2. Materials 2.1 Copper Mirror

A copper mirror consists of a vacuum-deposited film of copper metal (having a thickness equivalent to 10±5 percent transmission of normal incident light of 5000 angstroms) on a plane sheet of clear, transparent, polished glass. A convenient size is a 2.54 - by 7.6 cm (1- by 3-inch) microscope slide. These mirrors may be obtained from Evaporated Metal Films Corporation, Ithaca, N.Y. It is recommended that these mirrors be purchased in plastic tubes (2 mirrors per tube) which have been flushed with nitrogen. For long term storage, place the plastic containers in a convenient size dessicator which has been flushed with nitrogen.

2.1.1 Pretest Routine for Copper Mirrors

Before using a mirror for test, visually check for the presence of an excessive oxide film. If a visible oxide film is present, immerse the copper mirror in a 5 percent solution of ethylene diamine tetracetic acid (EDTA) or similar chelating agent for copper oxide. Wash the plate thoroughly in running water. Immerse in clean ethyl or methyl alcohol. Dry with clean, oil-free air. The mirror is acceptable if no oxide film is visible and the copper film has not been visibly damaged. View copper film in good light.

3. Testing 3.1 Method B (Solid Material)

Place about 1½ grams of material to be tested in the bottom of a test tube formed by fusing a 10 to 12 mm diameter glass tube 30.5 to 35.5 cm (12 to 14 inches) in length. Make two bends at approximately right angles to divide the tubing into two similar compartments. See FIG. 1. Cut a 2.54 by 7.6 cm (1- by 3-inch) mirror into a size which fits easily into the upper compartment [approximately 2.54 by 0.64 cm (1 by ¼ inch)]. Place it in the upper compartment. Seal the tubing with a tight-fitting cork stopper wrapped in aluminum foil. Place the lower compartment of the glass tubing (which contains the material) in an oven or oil bath heated to the temperature specified. The upper compartment shall be placed so that the copper mirror is sufficiently removed from the source of heat.

After the specified test period, remove the copper mirror and examine it visually by placing it against a white background using a standard light source per ASTM D 1729. Any complete removal of the copper film in any part of the mirror as evidenced by the white background showing through constitutes failure and shall be cause for rejection. Discoloration of the copper film or a partial reduction of its thickness shall not be cause for rejection. This test shall be run in duplicate. Failure in one mirror shall be cause for rejection. The copper mirror may be observed for failure in situ.

3.2 Testing Conditions

These are desired test periods and temperatures.

EXAMPLES AND COMPARATIVE EXAMPLES 4C-10

A variety of molding resins were made and tested as shown in Table 2. All the molding resins contained PBT-2 polymer whose method of preparation is given in Example 1. It will be noted that the molding resin formulations given in Table 2 incorporate by reference the "M1" formulation given in Table 1. All of the molding resins were tested at 175° C. according to the Bell Corrosion Test given in Example 3, except that "life" to failure was determined by the earliest failure of any sample out of 3, rather than 2, samples. Examples having the suffix "C" after the number are all Comparative Examples. They are not within the claimed invention.

The data in Table 2 suggests the following conclusions. Resins containing no MD-1024 caused corrosion very rapidly, in several hours (Comparative Examples 4C, 5C and 6C). The addition of very small amounts of MD-1024 (e.g. 0.05% on molding resins and 0.08% on PBT-2 polymer in Example 7), dramatically reduced corrosion (Examples 7, 8 and 9 contrasted to Comparative Example 4C). The addition of excess MD-1024 appears to be harmful (Example 10 compared with Example 9). The addition of Irganox 1010 (a phenolic antioxidant which is free of nitrogen) to MD-1024 is harmful, rather than beneficial (Comparative Examples 9C1 and 9C2 contrasted to Example 9).

TABLE 2

Summary of Examples 4C-10

| Ex. No. | Molding Resin (see Table 1) | Bell's Test Temp. °C. | Life (Hrs) |
|---|---|---|---|
| 4C | M1 | 175 | 3.5 |
| 5C | PBT-2 | 175 | 2.0 |
| 6C | PBT-2 w/30% fiberglass | 175 | 2.0 |
| 7 | M1 w/0.05% MD-1024 | 175 | 60 |
| 8 | M1 w/0.1% MD-1024 | 175 | 60 |
| 9C1 | M1 w/0.25% MD-1024 and 0.25% Irganox 1010 | 175 | 10.5 |
| 9C2 | M1 w/0.125% MD-1024, 0.125% Irganox 1010 and 0.25% DSTDP | 175 | 10.5 |
| 9 | M1 w/0.25% MD-1024 | 175 | 60 |
| 10 | M1 w/0.5% MD-1024 | 175 | 40.5 |

EXAMPLES AND COMPARATIVE EXAMPLES 11C-23

A variety of molding resins were made and tested as shown in Table 3. All the molding resins contained PBT-2 polymer whose method of preparation is given in Example 1. It will be noted that the molding resin formulations given in Table 3 incorporate by reference the "M2"-"M4" formulations given in Table 1. All of the molding resins were tested at 150° C. and/or 175° C. according to the Bell Corrosion Test given in Example 3, except that "life" to failure was determined by the earliest failure of any sample out of 4, rather than 2, samples. Examples having the suffix "C" are Comparative Examples.

TABLE 3
Summary of Examples 11C-23

| Ex. No. | Molding Resin (see Table 1) | Bell's Test Temp. °C | Life (Hrs) |
|---|---|---|---|
| 11C | PBT-1 | 150 | 25 |
| 12C | M2 | 150 | 16 |
| 13C | M4 | 150 | 16 |
| 13 | M4 w/0.2% MD-1024 | 150 | >168 |
| 14C | PBT-1 | 175 | 8 |
| 15C | M2 | 175 | 8 |
| 16C | M4 | 175 | 8 |
| 16 | M4 w/0.2% MD-1024 | 175 | 96 |
| 17C | M5 | 150 | >168 |
| 17 | M5 w/0.2% MD-1024 | 150 | >168 |
| 18C | PBT-1 | 150 | 16 |
| 19C | M3 | 150 | 40 |
| 20C | M5 | 150 | 24 |
| 20 | M5 w/0.2% MD-1024 | 150 | >168 |
| 21C | PBT-1 | 175 | 16 |
| 22C | M3 | 175 | 40 |
| 23C | M5 | 175 | 20 |
| 23 | M5 w/0.2% MD-1024 | 175 | 44 |

The Bell Corrosion Test data in Table 3 demonstrates the effectiveness of Irganox MD-1024 in reducing corrosion from PBT-1 vapors, at temperatures of 150° C. as well as 175° C. It also shows the significant effect of temperature upon corrosion rate. It should be noted that Example 20C repeated Example 17C; and Example 20 repeated Example 17. The results of Example 17C appear to be spurious at first sight. However, the test method implies variability between apparently identical samples.

EXAMPLE 24 AND COMPARATIVE EXAMPLE 24C

Examples 24 and 24C correspond to Examples 16 and 16C respectively, except that the molding resin also included 1% by weight of a light gray pigment. The pigment was predominantly titanium dioxide, with most of the remainder being carbon black. Bell Corrosion Test results at 175° C. indicated that lives were not less than those obtained without pigment in Example 16 and Comparative Example 16C. This suggests that high weight ratios of titanium dioxide to Irganox MD-1024 can be tolerated.

It is believed that the results obtained in the foregoing Examples and Comparative Examples are best explained by the hypothesis that the Irganox MD-1024 is a corrosion inhibitor by the Bell Corrosion Test on account of its ability to react with pre-existing volatile corrosive trace impurities in PBT based polymers, rather than as a stabilizer for the PBT polymer. Such pre-existing impurities are formed during polymerization in the molten state, rather than degradation in the solid state. The boiling points of some trace impurities, in unoxidized and oxidized form are as follows: tetrahydrofuran (65° C.); furan (32° C.); succinic acid (235° C.); butenal (104° C.); butanal (76° C.); butanoic acid (164° C.); acrolein (53° C.); propionaldehyde (60° C.); propenoic acid (142° C.).

What we claim is:

1. A flame retardant molding resin capable of being molded into an article exhibiting reduced tendency to corrode a copper surface when the molded resin and the copper surface are placed in spaced relationship in a common unventilated atmosphere at elevated temperatures, as measured by the Bell Telephone Laboratories Copper Corrosion Test at temperaures within the range of from 150° to 175° C., wherein the molding resin comprises the combination of (a) a poly(butylene terephthalate) polymer and (b) a flame retardant comprising aromatic halogen groups in a flame retardant amount, and (c) an alkylhydroxyphenylalkanoyl-hydrazine in an amount that is within the range of from 0.05 to 0.6% by weight, based on the weight of the molding resin, and less than 0.8% by weight based on the polymer; and wherein the molding resin has a life of at least 168 hours at 150° C. as measured by the Bell test based on 4 samples.

2. A resin of claim 1 in the form of a molded article.

3. A resin of claim 1, wherein the alkylhydroxyphenyalkanoyl-hydrazine is represented by the formula:

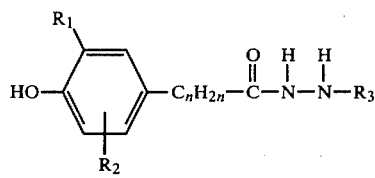

wherein $R_1$ is a lower alkyl group containing from 1 to 6 carbon atoms, $R_2$ is selected from the group consisting of hydrogen and lower alkyl containing from 1 to 6 carbon atoms, $R_3$ is selected from the group consisting of hydrogen, alkanoyl containing from 2 to 18 carbon atoms and a group represented by the formula:

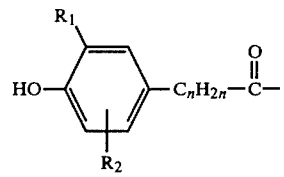

wherein $R_1$ and $R_2$ are defined above and n is a number from 0 to 5.

4. A resin of claim 3 wherein the alkylhydroxyphenylalkanoyl-hydrazine is represented by the following structure:

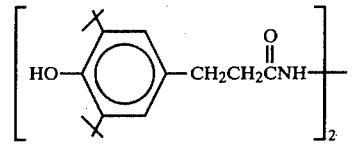

5. A resin of claim 3, wherein the alkylhydroxyphenylalkanoyl-hydrazine is N-N'-bis[3-(3,5-di t-butyl-4-hydroxy phenyl propionyl)]-hydrazine and is present in an amount of less than 0.4% by weight based on the molding resin, and less than 0.5% by weight based on the poly(butylene terephthalate) polymer.

6. A resin of claim 5, which comprises less than 0.2% by weight of a phenolic antioxidant that is free of nitrogen.

7. A resin of claim 6, which comprises the absence of a phenolic antioxidant that is free of nitrogen.

8. A resin of claim 5, which comprises poly(1,4-butylene terephthalate) polymer having an intrinsic viscosity within the range of from 0.7 to 1.1 dl/gm and decabromo diphenyl oxide in an amount of from 3 to 10 percent by weight based on the molding resin and alkylhydroxyphenylalkanoyl-hydrazine in an amount that is within the range of from 0.05 to 0.3% by weight, based on the weight of the molding resin.

* * * * *